(12) United States Patent
Liu

(10) Patent No.: US 10,667,260 B2
(45) Date of Patent: May 26, 2020

(54) METHOD AND DEVICE IN USER EQUIPMENT AND BASE STATION FOR WIRELESS COMMUNICATIONS

(71) Applicant: Shanghai Langbo Communication Technology Company Limited, Shanghai (CN)

(72) Inventor: Zheng Liu, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 0 days.

(21) Appl. No.: 16/164,748

(22) Filed: Oct. 18, 2018

(65) Prior Publication Data

US 2019/0124655 A1    Apr. 25, 2019

(30) Foreign Application Priority Data

Oct. 20, 2017  (CN) .......................... 2017 1 0983734

(51) Int. Cl.
| | | |
|---|---|---|
| *H04W 72/04* | (2009.01) | |
| *H04L 5/00* | (2006.01) | |
| *H04W 68/00* | (2009.01) | |
| *H04W 88/08* | (2009.01) | |
| *H04W 48/12* | (2009.01) | |

(52) U.S. Cl.
CPC ......... *H04W 72/0446* (2013.01); *H04L 5/003* (2013.01); *H04L 5/0094* (2013.01); *H04L 5/0007* (2013.01); *H04L 5/0053* (2013.01); *H04W 48/12* (2013.01); *H04W 68/00* (2013.01); *H04W 72/042* (2013.01); *H04W 88/08* (2013.01)

(58) Field of Classification Search
CPC ............. H04W 72/0446; H04W 48/12; H04W 72/042; H04W 88/08; H04W 68/00; H04W 72/046; H04W 72/0453; H04W 68/02; H04W 68/005; H04L 1/0027; H04L 5/003; H04L 5/0094; H04L 5/0053; H04L 5/0007; H04L 1/08; H04L 5/0023
See application file for complete search history.

(56) References Cited

U.S. PATENT DOCUMENTS

| | | | | |
|---|---|---|---|---|
| 9,525,540 | B1* | 12/2016 | Shellhammer | ........ H04L 7/0012 |
| 9,894,654 | B2* | 2/2018 | Astely | ................... H04L 5/0037 |
| 2016/0373237 | A1* | 12/2016 | Shellhammer | ........ H04L 7/0012 |
| 2018/0160313 | A1* | 6/2018 | Montojo | ............... H04W 16/14 |
| 2018/0332533 | A1* | 11/2018 | Bhattad | ................. H04W 56/00 |

(Continued)

*Primary Examiner* — Brian T O Connor
(74) *Attorney, Agent, or Firm* — Maschoff Brennan

(57) ABSTRACT

The present disclosure discloses a method and device in user equipment and a base station for wireless communication. The user equipment receives first information first, then monitors a first sequence in target air interface resources, and then receives a first radio signal if the first sequence is detected; wherein the target air interface resources are one of M candidate air interface resources, the first sequence is repeatedly transmitted Q times in the time-domain resources included in the target air interface resources, the M is related to the Q, the first information is used to determine the time-domain resources included in the target air interface resources, and the M and the Q are positive integers, respectively. The method in the present disclosure can reduce the signaling header overhead and simplify the implementation.

16 Claims, 12 Drawing Sheets

(56) References Cited

U.S. PATENT DOCUMENTS

| | | |
|---|---|---|
| 2018/0368133 A1* | 12/2018 | Park .................... H04W 72/048 |
| 2019/0069228 A1* | 2/2019 | Malik ................... H04L 5/0048 |
| 2019/0075595 A1* | 3/2019 | Xue ..................... H04B 7/0486 |
| 2019/0090273 A1* | 3/2019 | Yoo ........................ H01Q 1/246 |
| 2019/0103950 A1* | 4/2019 | Liu .................... H04W 52/0212 |
| 2019/0104547 A1* | 4/2019 | Xue ..................... H04B 7/0617 |
| 2019/0141617 A1* | 5/2019 | Abedini ............. H04W 74/006 |
| 2019/0150088 A1* | 5/2019 | Sun .................. H04W 52/0229 |
| | | 455/574 |
| 2019/0230664 A1* | 7/2019 | Vummintala .......... H04B 1/713 |
| 2019/0239189 A1* | 8/2019 | Hwang ................ H04W 68/02 |
| 2019/0260521 A1* | 8/2019 | Luo ...................... H04L 1/1864 |

* cited by examiner

| first information | first-class positive integers $\{x_1, x_2, x_3, \cdots, x_{x1}\}$ | second-class positive integers $\{y_1, y_2, y_3, \cdots, y_{x2}\}$ |
|---|---|---|
| 0 | $x_1$ | $y_{x2}$ |
| 1 | $x_2$ | $y_{x2}$ |
| 2 | $x_3$ | $y_{x2-1}$ |
| 3 | $x_4$ | $y_{x2-1}$ |
| ... | ... | ... |
| N-1 | $x_{x1-1}$ | $y_2$ |
| N | $x_{x1}$ | $y_1$ |

FIG. 7

METHOD AND DEVICE IN USER EQUIPMENT AND BASE STATION FOR WIRELESS COMMUNICATIONS

CROSS REFERENCE TO RELATED APPLICATION

This application claims the priority benefit of Chinese Patent Application Serial Number 201710983734.X, filed on Oct. 20, 2017, the full disclosure of which is incorporated herein by reference.

BACKGROUND

Technical Field

The present disclosure relates to a transmitting method in wireless communication systems, and in particular to a method and device for supporting paging-related information transmission.

Related Art

In order to meet the needs of diverse Internet of Things (IoT) applications, a new narrowband wireless access system, i.e., Narrow Band Internet of Things (NB-IoT), was introduced in 3rd Generation Partner Project (3GPP) Rel-13. In addition to the NB-IoT system, 3GPP is also standardizing the features of Enhanced Machine Type Communication (eMTC). The NB-IoT and the eMTC are oriented towards different target market demands, respectively.

The NB-IoT system of Rel-13 and the eMTC system of Rel-13 were enhanced in 3GPP Rel-14. An important enhanced aspect of the NB-IoT was to support more functions on non-anchor physical resource blocks, such as supporting transmission of paging channels, supporting transmission of random access channels, etc., as well introducing positioning and multicast functions. For the eMTC, Rel-14 also introduced positioning and multicasting functions, while increasing the peak rate to meet higher requirements. In 3GPP Rel-15, further enhancement design is being carried out for the NB-IoT and the eMTC. One important aspect is to design wake-up signals to effectively reduce the monitoring of downlink control signaling, thereby further reducing power consumption. In 3GPP Rel-15, the Working Item (WI) of the 5G new air interface technology (NR) is also standardizing the 5G new air interface technology, and it is also very likely to introduce wake-up signals in the subsequent 5G evolution.

SUMMARY

A paging message for one user equipment is not necessarily transmitted on every possible transmission paging resources. If all user equipments share a same wake-up signal, even if there is no paging message for the user equipment, the user equipment will also be woken up and the subsequent downlink control channel is monitored as long as one other user equipment is paged, which will cause the power consumption of the user equipment to rise sharply. If the user equipments can be further grouped, the power consumption may be effectively reduced. However, on the other hand, since the wake-up signal is required to support transmission of a plurality of time-frequency resources or a plurality of sequences in order to group users, the detection performance and the header overhead of the wake-up signal will be affected.

In order to solve the above problem of wake-up signal configuration, the present disclosure provides a solution. It should be noted that the embodiments in the User Equipment (UE) of the present disclosure and the features in the embodiments may be applied to the base station without conflict, and vice versa. Further, the features of the embodiments and the embodiments of the present disclosure may be arbitrarily combined with each other without conflict.

The present disclosure discloses a method in user equipment for wireless communications, including:
receiving first information;
monitoring a first sequence in target air interface resources; and
receiving a first radio signal if the first sequence is detected;
wherein the target air interface resources are one of M candidate air interface resources, the first sequence is repeatedly transmitted Q times in the time-domain resources included in the target air interface resources, the M is related to the Q, the first information is used to determine the time-domain resources included in the target air interface resources, and the M and the Q are positive integers, respectively.

According to an aspect of the present disclosure, the above method is characterized in that the first information indicates a target combination in X candidate combinations, any one of the X candidate combinations includes one of X1 first-class positive integers and one of X2 second-class positive integers, a first-class positive integer included in the target combination is equal to an amount of time-domain resources included in the target air interface resources, and a second-class positive integer included in the target combination is equal to the M, where the X is a positive integer, the X1 is a positive integer, and the X2 is a positive integer.

According to an aspect of the present disclosure, the above method is characterized in that the M candidate air interface resources are in one-to-one correspondence with M terminal groups, any one of the M terminal groups includes a positive integer number of terminals, the target air interface resources correspond to a target terminal group, the target terminal group is one of the M terminal groups, and the monitor of the first sequence belongs to the target terminal group.

According to an aspect of the present disclosure, the above method is characterized by further including:
receiving a second radio signal;
wherein the first radio signal carries a first signaling, the first signaling is used to determine at least one of time-frequency resources occupied by the second radio signal, and a MCS used by the second radio signal, the second radio signal carries Y identifiers, where the Y is a positive integer, and the Y identifiers are used to determine whether a receiver of the second radio signal is paged.

According to an aspect of the present disclosure, the above method is characterized by further including:
receiving second information;
wherein a starting timeslot of the target air interface resources in the time domain belongs to a first time window, the first time window is one of L time windows, the second information includes L pieces of sub-information for the L time windows respectively, a piece of sub-information for the first time window among the L pieces of sub-information is first sub-information, and the first sub-information is used to determine whether the first sequence is not transmitted, where the L is a positive integer not less than one.

According to an aspect of the present disclosure, the above method is characterized in that a feature ID of a monitor of the first sequence is used to determine at least one of a position of the target air interface resources in the time domain, a position of the target air interface resources in the frequency domain, and a position of the target air interface resources in the code domain.

The present disclosure discloses a method in base station equipment for wireless communications, including:
  transmitting first information;
  transmitting a first sequence in target air interface resources; and
  transmitting a first radio signal;
  wherein the target air interface resources are one of M candidate air interface resources, the first sequence is repeatedly transmitted Q times in the time-domain resources included in the target air interface resources, the M is related to the Q, the first information is used to determine the time-domain resources included in the target air interface resources, and the M and the Q are positive integers, respectively.

According to an aspect of the present disclosure, the above method is characterized in that the first information indicates a target combination in X candidate combinations, any one of the X candidate combinations includes one of X1 first-class positive integers and one of X2 second-class positive integers, a first-class positive integer included in the target combination is equal to an amount of time-domain resources included in the target air interface resources, and a second-class positive integer included in the target combination is equal to the M, where the X is a positive integer, the X1 is a positive integer, and the X2 is a positive integer.

According to an aspect of the present disclosure, the above method is characterized in that the M candidate air interface resources are in one-to-one correspondence with M terminal groups, any one of the M terminal groups includes a positive integer number of terminals, the target air interface resources correspond to a target terminal group, the target terminal group is one of the M terminal groups, and a monitor of the first sequence belongs to the target terminal group.

According to an aspect of the present disclosure, the above method is characterized by further including:
  transmitting a second radio signal;
  wherein the first radio signal carries a first signaling, the first signaling is used to determine at least one of time-frequency resources occupied by the second radio signal, and a MCS used by the second radio signal, the second radio signal carries Y identifiers, where the Y is a positive integer, and the Y identifiers are used to determine whether a receiver of the second radio signal is paged.

According to an aspect of the present disclosure, the above method is characterized by further including:
  transmitting second information;
  wherein a starting timeslot of the target air interface resources in the time domain belongs to a first time window, the first time window is one of L time windows, the second information includes L pieces of sub-information for the L time windows respectively, a piece of sub-information for the first time window among the L pieces of sub-information is first sub-information, and the first sub-information is used to determine whether the first sequence is not transmitted, where the L is a positive integer not less than one.

According to an aspect of the present disclosure, the above method is characterized in that a feature ID of a monitor of the first sequence is used to determine at least one of a position of the target air interface resources in the time domain, a position of the target air interface resources in the frequency domain, and a position of the target air interface resources in the code domain.

The present disclosure discloses user equipment for wireless communications, including:
  a first receiver module to receive first information;
  a second receiver module to monitor a first sequence in target air interface resources; and
  a third receiver module to receive a first radio signal if the first sequence is detected;
  wherein the target air interface resources are one of M candidate air interface resources, the first sequence is repeatedly transmitted Q times in the time-domain resources included in the target air interface resources, the M is related to the Q, the first information is used to determine the time-domain resources included in the target air interface resources, and the M and the Q are positive integers, respectively.

According to an aspect of the present disclosure, the above user equipment is characterized in that the first information indicates a target combination in X candidate combinations, any one of the X candidate combinations includes one of X1 first-class positive integers and one of X2 second-class positive integers, a first-class positive integer included in the target combination is equal to an amount of time-domain resources included in the target air interface resources, and a second-class positive integer included in the target combination is equal to the M, where the X is a positive integer, the X1 is a positive integer, and the X2 is a positive integer.

According to an aspect of the present disclosure, the above user equipment is characterized in that the M candidate air interface resources are in one-to-one correspondence with M terminal groups, any one of the M terminal groups includes a positive integer number of terminals, the target air interface resources correspond to a target terminal group, the target terminal group is one of the M terminal groups, and a monitor of the first sequence belongs to the target terminal group.

According to an aspect of the present disclosure, the above user equipment is characterized by further including:
  the third receiver module receiving a second radio signal;
  wherein the first radio signal carries a first signaling, the first signaling is used to determine at least one of time-frequency resources occupied by the second radio signal, and a MCS used by the second radio signal, the second radio signal carries Y identifiers, where the Y is a positive integer, and the Y identifiers are used to determine whether a receiver of the second radio signal is paged.

According to an aspect of the present disclosure, the above user equipment is characterized by further including:
  the first receiver module receiving second information;
  wherein a starting timeslot of the target air interface resources in the time domain belongs to a first time window, the first time window is one of L time windows, the second information includes L pieces of sub-information for the L time windows respectively, a piece of sub-information for the first time window among the L pieces of sub-information is first sub-information, and the first sub-information is used to determine whether the first sequence is not transmitted, where the L is a positive integer not less than one.

According to an aspect of the present disclosure, the above user equipment is characterized in that a feature ID of a monitor of the first sequence is used to determine at least one of a position of the target air interface resources in the time domain, a position of the target air interface resources in the frequency domain, and a position of the target air interface resources in the code domain.

The present disclosure discloses base station equipment for wireless communications, including:

a first transmitter module to transmit first information;

a second transmitter module to transmit a first sequence in target air interface resources; and a third transmitter module configured to transmit a first radio signal;

wherein the target air interface resources are one of M candidate air interface resources, the first sequence is repeatedly transmitted Q times in the time-domain resources included in the target air interface resources, the M is related to the Q, the first information is used to determine the time-domain resources included in the target air interface resources, and the M and the Q are positive integers, respectively.

According to an aspect of the present disclosure, the above base station equipment is characterized in that the first information indicates a target combination in X candidate combinations, any one of the X candidate combinations includes one of X1 first-class positive integers and one of X2 second-class positive integers, a first-class positive integer included in the target combination is equal to an amount of time-domain resources included in the target air interface resources, and a second-class positive integer included in the target combination is equal to the M, where the X is a positive integer, the X1 is a positive integer, and the X2 is a positive integer.

According to an aspect of the present disclosure, the above base station equipment is characterized in that the M candidate air interface resources are in one-to-one correspondence with M terminal groups, any one of the M terminal groups includes a positive integer number of terminals, the target air interface resources correspond to a target terminal group, the target terminal group is one of the M terminal groups, and a monitor of the first sequence belongs to the target terminal group.

According to an aspect of the present disclosure, the above base station equipment is characterized by further including:

the third transmitter module transmitting a second radio signal;

wherein the first radio signal carries a first signaling, the first signaling is used to determine at least one of time-frequency resources occupied by the second radio signal, and a MCS used by the second radio signal, the second radio signal carries Y identifiers, where the Y is a positive integer, and the Y identifiers are used to determine whether a receiver of the second radio signal is paged.

According to an aspect of the present disclosure, the above base station equipment is characterized by further including:

the first transmitter module transmitting second information;

wherein a starting timeslot of the target air interface resources in the time domain belongs to a first time window, the first time window is one of L time windows, the second information includes L pieces of sub-information for the L time windows respectively, a piece of sub-information for the first time window among the L pieces of sub-information is first sub-information, and the first sub-information is used to determine whether the first sequence is not transmitted, where the L is a positive integer not less than one.

According to an aspect of the present disclosure, the above base station equipment is characterized in that a feature ID of a monitor of the first sequence is used to determine at least one of a position of the target air interface resources in the time domain, a position of the target air interface resources in the frequency domain, and a position of the target air interface resources in the code domain.

In one embodiment, the method of the present disclosure has the following advantages:

the coverage performance or header overhead of the wake-up signal is jointly determined by the number of sequences or the number of groups supported by the wake-up signal and the repeated transmissions of the wake-up signal. Using the method of the present disclosure, the number of groups that can be supported by the wake-up signal is associated with the time length of the time domain resources used by the wake-up signal or the number of repeated transmissions, therefore reducing the signaling overhead of configuring the wake-up signal;

the number of groups supported by the wake-up signal and the time length of the time domain resources used by the wake-up signal or the number of repeated transmissions are jointly coded, which may reduce the number of possible combinations of the number of groups and the duration of the wake-up signal, simplifying the implementation when the wakeup signal is configured according to the SINR or header overhead requirements.

BRIEF DESCRIPTION OF THE DRAWINGS

Other features, objects and advantages of the present disclosure will become more apparent from the detailed description of non-restrictive embodiments taken in conjunction with the following drawings.

FIG. 7 is a schematic diagram illustrating a target combination according to one embodiment of the present disclosure;

DESCRIPTION OF THE EMBODIMENTS

The technical schemes of the present disclosure will be further described in details below with reference to the accompanying drawings. It should be noted that the embodiments of the present disclosure and the features in the embodiments may be combined with each other without conflict.

Embodiment 1

Figure 1:
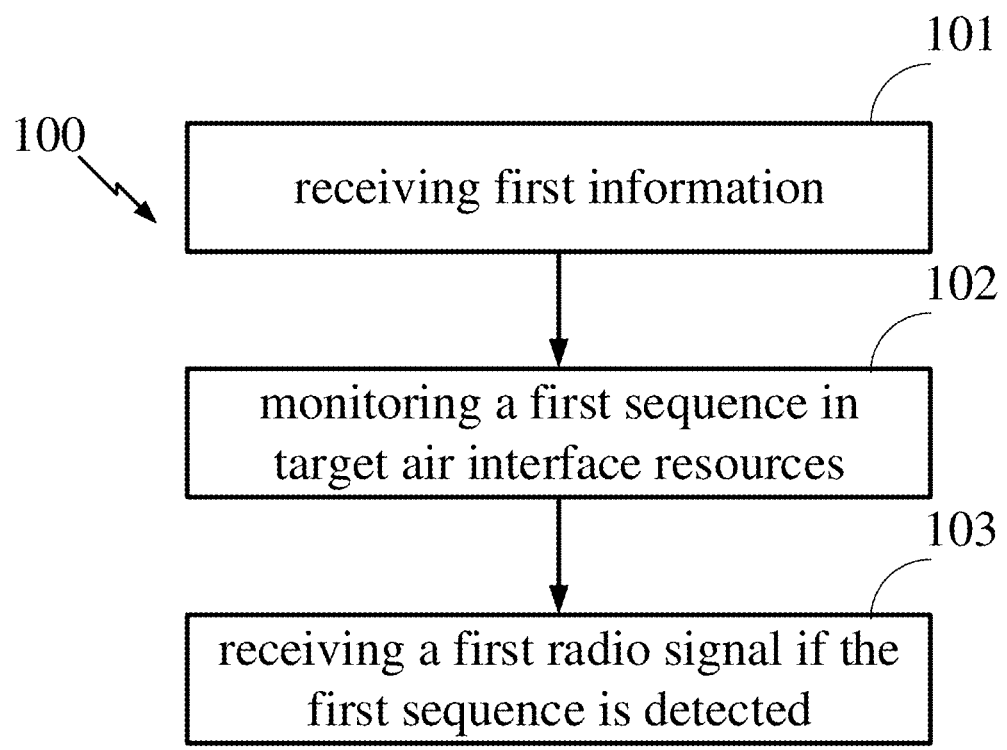
FIG. 1 is a flow chart illustrating transmission of first information, a first sequence and a first radio signal according to one embodiment of the present disclosure.

Embodiment 1 is a flow chart illustrating transmission of first information, a first sequence and a first radio signal according to one embodiment of the present disclosure, as shown in FIG. 1. In FIG. 1, each block represents a step. In Embodiment 1, the user equipment in the present disclosure first receives first information, then monitors a first sequence in target air interface resources, and then receives a first radio signal if the first sequence is detected; wherein the target air interface resources are one of M candidate air interface resources, the first sequence is repeatedly transmitted Q times in the time-domain resources included in the target air interface resources, the M is related to the Q, the first information is used to determine the time-domain resources included in the target air interface resources, and the M and the Q are positive integers, respectively.

In one embodiment, if the first sequence is not detected, the user equipment abandons receiving the first radio signal.

In one embodiment, if the first sequence is not detected, the user equipment still receives the first radio signal.

In one embodiment, the M is greater than one.

In one embodiment, the Q is equal to a non-negative integer power of two.

In one embodiment, each candidate air interface resources in the M candidate air interface resources includes at least one of time-frequency resources and code domain resources.

In one embodiment, the M candidate air interface resources include M candidate sequences and time-frequency resources respectively occupied by the M candidate sequences, the first sequence is one of the M candidate sequences, and the target air interface resources include the first sequence and time-frequency resources occupied by the first sequence.

In one embodiment, the M candidate air interface resources include M candidate sequences, respectively, the first sequence is one of the M candidate sequences, the target air interface resources include the first sequence, and any two of the M candidate sequences are not the same, where the M is greater than one.

In one embodiment, time-frequency resources included in any two of the M candidate air interface resources are the same.

In one embodiment, the M candidate air interface resources include M candidate sequences, respectively, time-frequency resources occupied by any two of the M candidate sequences are the same, the first sequence is one of the M candidate sequences, and the target air interface resources include code domain resources of the first sequence and time-frequency resources occupied by the first sequence, where the M is greater than 1.

In one embodiment, the M candidate air interface resources include M different candidate time-frequency resources, respectively.

In one embodiment, the M candidate air interface resources include M different candidate time-frequency resources, respectively, and each of the M different candidate time-frequency resources carries the first sequence.

In one embodiment, the M candidate air interface resources include M different candidate time-frequency resources, respectively, and two of the M different candidate time-frequency resources carry different sequences, where the M is greater than 1.

In one embodiment, the first information is used by the user equipment to determine time-domain resources included in the target air interface resources.

In one embodiment, the first information is used by the user equipment to determine an amount of time-domain resources included in the target air interface resources.

In one embodiment, the first information indicates an amount of time-domain resources included in the target air interface resources.

In one embodiment, the first information indicates an amount of subframes included in the target air interface resources.

In one embodiment, the first information indicates an amount of subframes included in the target air interface resources, and the amount of subframes included in the target air interface resources is equal to the Q.

In one embodiment, an amount of time-domain resources included in the target air interface resources is used to determine the Q.

In one embodiment, the Q and an amount of time-domain resources included in the target air interface resources are implicitly associated.

In one embodiment, the M is related to the Q, indicating that the Q is used to determine the M.

In one embodiment, the M is related to the Q, indicating that different Qs result in different Ms.

In one embodiment, the M is related to the Q, indicating that the value ranges of the M and the Q are implicitly associated.

In one embodiment, the Q determines the M according to a given mapping relationship.

In one embodiment, the target air interface resources include Q time intervals, and one transmission of the first sequence occupies one time interval of the Q time intervals.

In one embodiment, a detection of the first sequence by the user equipment is implemented based on energy detection.

In one embodiment, a detection of the first sequence by the user equipment is implemented based on a sequence correlation operation.

In one embodiment, the first sequence is transmitted on the target air interface resources.

In one embodiment, the first sequence is not transmitted on the target air interface resources.

In one embodiment, the first information is carried by high-layer signaling.

In one embodiment, the first information is carried by Radio Resource Control (RRC) signaling.

In one embodiment, the first information includes a System Information Block (SIB).

In one embodiment, the first information includes all or a part of System Information Block Type 1 (SIB1) and System Information Block Type 2 (SIB2).

In one embodiment, the first information includes all or a part of System Information Block Type 1-Narrow Band (NB) (SIB1-NB) and System Information Block Type 2-Narrow Band (NB) (SIB2-NB).

In one embodiment, the first sequence is used for wake-up of the user equipment in a Radio Resource Control (RRC) idle state (RRC_idle).

In one embodiment, the first sequence is used for wake-up of the user equipment in Discontinuous Reception (DRX).

In one embodiment, the first sequence is used for wake-up of the user equipment in enhanced Discontinuous Reception (eDRX).

In one embodiment, the first sequence is used to generate a Wake-Up Signal (WUS).

In one embodiment, a detection of the first sequence by the user equipment does not require the user equipment to initiate baseband processing.

In one embodiment, a detection of the first sequence by the user equipment requires the user equipment to initiate baseband processing.

In one embodiment, the user equipment detects the first sequence and the user equipment receives the first radio signal using different baseband processing modules.

In one embodiment, the first radio signal is generated by a first bit block, the first bit block includes Cyclic Redundancy Check (CRC) bits, and the CRC bits are scrambled by Paging Radio Network Temporary Identity (P-RNTI).

In one embodiment, the first radio signal is transmitted through a Physical Downlink Control Channel (PDCCH).

In one embodiment, the first radio signal is transmitted through a Narrow Band Physical Downlink Control Channel (NPDCCH).

In one embodiment, the first radio signal is transmitted through a Machine type Physical Downlink Control Channel (MPDCCH).

In one embodiment, the first sequence is generated by a Zadoff-Chu (ZC) sequence.

In one embodiment, the first sequence is generated by all or a part of a plurality of ZC sequences which have been concatenated.

In one embodiment, the first sequence is generated by a Pseudo-Noise (PN) sequence.

In one embodiment, the first sequence is generated by concatenation of one or more ZC sequences scrambled by a PN sequence.

In one embodiment, the first sequence is generated by a Gold sequence.

In one embodiment, the first sequence is generated by concatenation of one or more ZC sequences scrambled by a Gold sequence.

Embodiment 2

Figure 2:
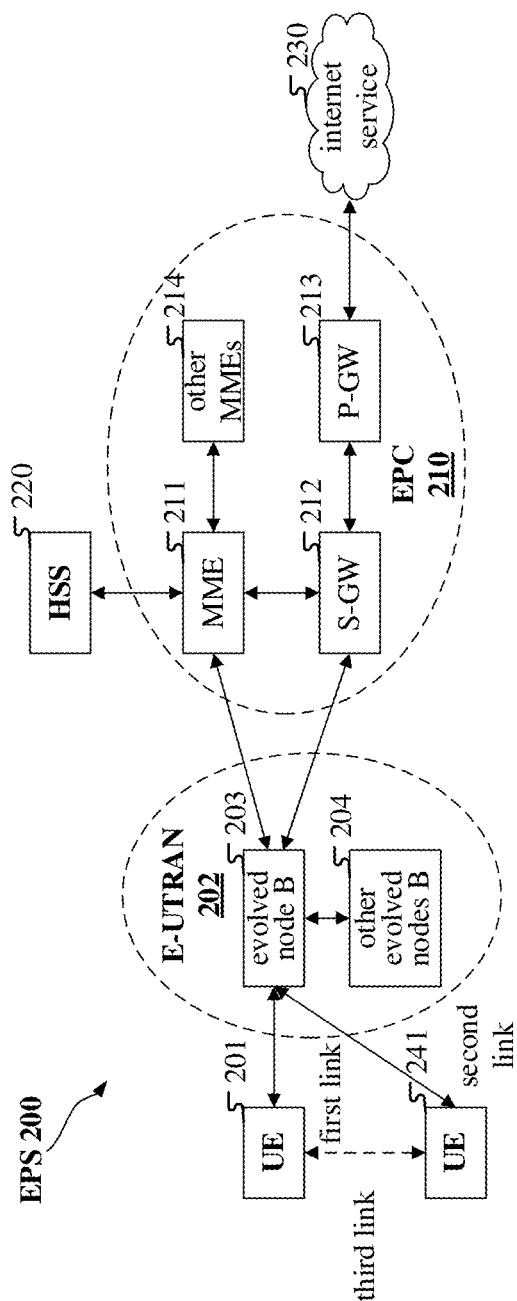
FIG. 2 is a schematic diagram illustrating a network architecture according to one embodiment of the present disclosure.

Embodiment 2 is a schematic diagram illustrating a network architecture according to the present disclosure, as shown in FIG. 2. FIG. 2 is a diagram illustrating a network architecture 200 of Long-Term Evolution (LTE), Long-Term Evolution Advanced (LTE-A) and future 5G systems. The LTE network architecture 200 may be called an Evolved Packet System (EPS) 200. The EPS 200 may include one or more UEs 201, an Evolved UMTS Terrestrial Radio Access Network (E-UTRAN) 202, an Evolved Packet Core (5G-CN/EPC) 210, a Home Subscriber Server (HSS) 220 and an Internet Service 230. Herein, the UMTS represents Universal Mobile Telecommunication System. The EPS may be interconnected with other access networks. For simple description, the entities/interfaces are not shown. As shown in FIG. 2, the EPS provides packet switching services. Those skilled in the art are easy to understand that various concepts presented throughout the present disclosure may be extended to networks providing circuit switching services. The E-UTRAN includes an Evolved Node B (eNB) 203 and other eNBs 204. The eNB 203 provides UE 201 oriented user plane and control plane protocol terminations. The eNB 203 may be connected to other eNBs 204 via an X2 interface (for example, backhaul). The eNB 203 may be referred to as a base station, a base transceiver station, a radio base station, a radio transceiver, a transceiver function, a Basic Service Set (BSS), an Extended Service Set (ESS), a Transmitter Receiver Point (TRP) or other appropriate terms. The eNB 203 provides an access point of the EPC 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrow-band IoT network equipment, machine-type communication devices, land vehicles, automobiles, wearable equipment, or any other devices having similar functions. Those skilled in the art also may call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or other appropriate terms. The eNB 203 is connected to the EPC 210 via an S1 interface. The EPC 210 includes an MME 211, other MMEs 214, a Service Gateway (S-GW) 212 and a Packet Data Network Gateway (P-GW) 213. The MME 211 is a control node for processing a signaling between the UE 201 and the EPC 210. Generally, the MME 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IP IMSs) and Packet Switching Streaming Services (PSSs).

In one sub-embodiment, the UE 201 corresponds to the UE in the present disclosure.

In one embodiment, the eNB 203 corresponds to the base station in the present disclosure.

In one embodiment, the UE 201 supports paging transmission.

In one embodiment, the eNB 203 supports paging transmission.

In one embodiment, the UE 201 supports transmission of wake-up signals.

In one embodiment, the eNB 203 supports transmission of wake-up signals.

Embodiment 3

Figure 3:
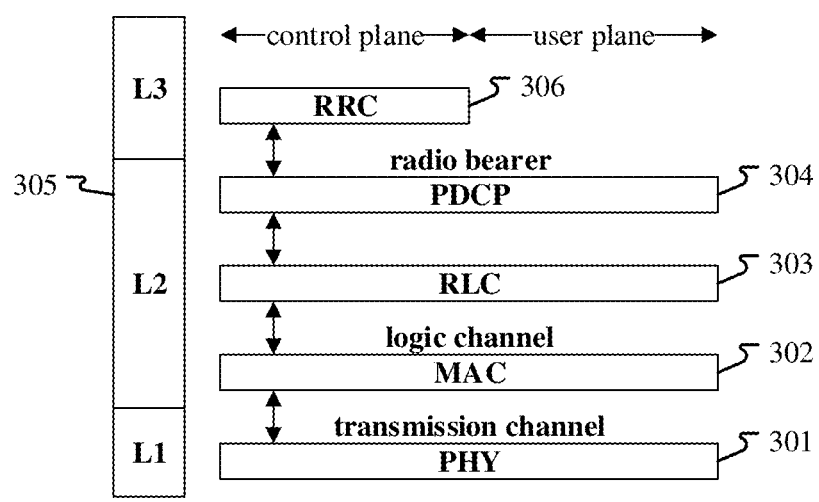
FIG. 3 is a schematic diagram illustrating a radio protocol architecture of a user plane and a control plane according to one embodiment of the present disclosure.

Embodiment 3 is a schematic diagram illustrating a radio protocol architecture of a user plane and a control plane according to the present disclosure, as shown in FIG. 3. FIG. 3 illustrates a schematic diagram of a radio protocol architecture of a user plane and a control plane. In FIG. 3, the radio protocol architecture of user equipment (UE) and Base Station Equipment (gNB or eNB) is represented by three layers, which are a layer 1, a layer 2 and a layer 3 respectively. The layer 1 (L1) 301 is the lowest layer and performs signal processing functions of each PHY layer. The layer 1 is called PHY 301 in this paper. The layer 2 (L2) 305 is above the PHY 301, and is in charge of the link between the UE and the gNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers terminate at the gNB of the network side. Although not described in FIG. 3, the UE may include several higher layers above the L2 305, such as a network layer (i.e. IP layer) terminated at a P-GW of the network side and an application layer terminated at the other side of the connection (i.e. a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a lost packet so as to compensate the disordered receiving caused by Hybrid Automatic Repeat Request (HARQ). The MAC sublayer 302 provides multiplexing between logical channels and transport channels. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression function for the control plane. The control plane also includes a Radio Resource Control (RRC) sublayer 306 in the layer 3 (L3). The RRC sublayer 306 is responsible for acquiring radio resources (i.e. radio bearer) and configuring the lower layers using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station equipment in the present disclosure.

In one embodiment, the first information in the present disclosure is generated in the RRC 306.

In one embodiment, the second information in the present disclosure is generated in the RRC 306.

In one embodiment, the first sequence in the present disclosure is generated in the PHY 301.

In one embodiment, the first radio signal in the present disclosure is generated in the PHY 301.

In one embodiment, the first radio signal in the present disclosure is generated in the MAC 302.

In one embodiment, the second radio signal in the present disclosure is generated in the PHY 301.

In one embodiment, the second radio signal in the present disclosure is generated in the RRC 306.

Embodiment 4

Figure 4:
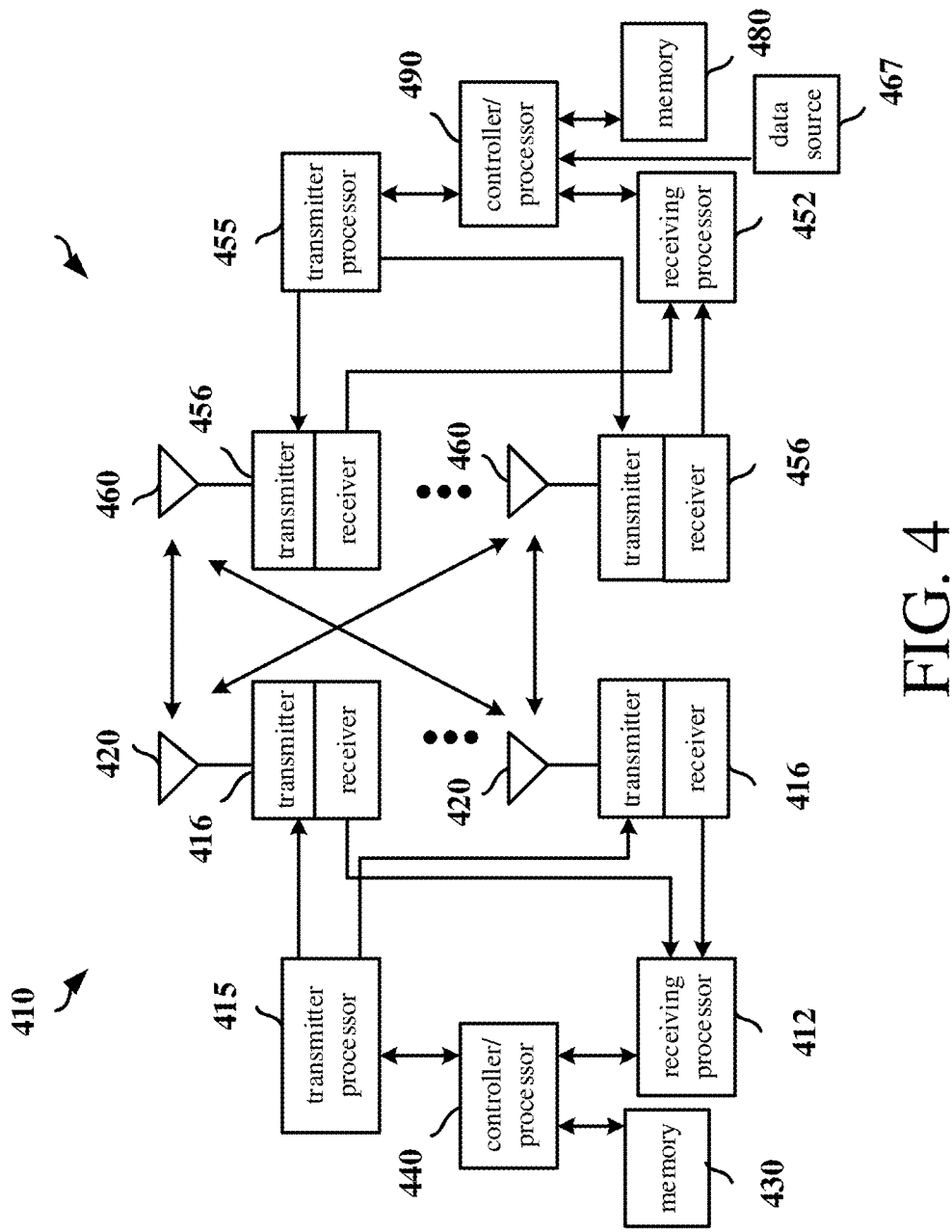
FIG. 4 is a schematic diagram illustrating base station equipment and user equipment according to an embodiment of the present disclosure.

Embodiment 4 is a schematic diagram illustrating base station equipment and given user equipment according to the present disclosure, as shown in FIG. 4. FIG. 4 is a block diagram of a gNB/eNB 410 in communication with a UE 450 in an access network.

The user equipment (UE 450) includes a controller/processor 490, a memory 480, a receiving processor 452, a transmitter/receiver 456, a transmitting processor 455 and a data source 467, and the transmitter/receiver 456 includes an antenna 460. Data source 467 provides an upper-layer packet to the controller/processor 490, which provides packet header compression and decompression, encryption and decryption, packet segmentation connection and reordering, and multiplexing and demultiplexing between the logical and transport channels for implementing the L2 layer protocol for the user plane and the control plane. The upper-layer packet may include data or control information, such as a Downlink Shared Channel (DL-SCH) or Uplink Shared Channel (UL-SCH). The transmitting processor 455 implements various signal transmission processing functions for the L1 layer (i.e., the physical layer) including coding, interleaving, scrambling, modulating, power control/allocation, precoding, physical layer control signaling generation, etc. The receiving processor 452 implements various signal receiving processing functions for the L1 layer (i.e., the physical layer) including decoding, deinterleaving, descrambling, demodulating, de-precoding, physical layer control signaling extraction, etc. The detection of the first sequence in the present disclosure is done at the receiving processor 452. The transmitter 456 is configured to convert the baseband signal provided by the transmitting processor 455 into a radio frequency signal and transmit the signal via the antenna 460. The receiver 456 is configured to convert the radio frequency signal received through the antenna 460 into a baseband signal and provide the signal to the receiving processor 452.

The base station equipment (410) may include a controller/processor 440, a memory 430, a receiving processor 412, a transmitter/receiver 416 and a transmitting processor 415, and the transmitter/receiver 416 includes an antenna 420. The upper-layer packet arrives at the controller/processor 440, which provides packet header compression and decompression, encryption and decryption, packet segmentation connection and reordering, and multiplexing and demultiplexing between the logical and transport channels for implementing the L2 layer protocol for the user plane and the control plane. The upper-layer packet may include data or control information, such as a DL-SCH or UL-SCH. The transmitting processor 415 implements various signal transmission processing functions for the L1 layer (i.e., the physical layer) including coding, interleaving, scrambling, modulating, power control/allocation, precoding, physical layer control signaling (including PBCH, PDCCH, reference signals) generation, etc. The first sequence in the present disclosure is generated by the transmitting processor 415. The receiving processor 412 implements various signal receiving processing functions for the L1 layer (i.e., the physical layer) including decoding, deinterleaving, descrambling, demodulating, de-precoding, physical layer control signaling extraction, etc. The transmitter 416 is configured to convert the baseband signal provided by the transmitting processor 415 into a radio frequency signal and transmit the signal via the antenna 420. The receiver 416 is configured to convert the radio frequency signal received through the antenna 420 into a baseband signal and provide the signal to the receiving processor 412.

In the Downlink (DL), the upper-layer packet DL-SCH includes the first information in the present disclosure, and the second information and the second radio signal are provided to the controller/processor 440. The controller/processor 440 implements the function for the L2 layer. In the DL, the controller/processor 440 provides packet header compression, encryption, packet segmentation and reordering, multiplexing between the logical and transport channels, and radio resource allocation to the UE 450 based on various priority metrics. The controller/processor 440 is also responsible for HARQ operation, retransmission of lost packets, and signaling to the UE 450. The transmitting processor 415 implements various signal processing functions for the L1 layer (i.e., the physical layer). The first sequence and first radio signal in the present disclosure are generated at the transmitting processor 415. The signal processing functions include decoding and interleaving to facilitate Forward Error Correction (FEC) at the UE 450 and modulating the baseband signal based on various modulation schemes (such as binary phase shift keying (BPSK), quadrature phase shift keying (QPSK)). The modulation symbols are divided into parallel streams and each stream is mapped to a corresponding multi-carrier subcarrier and/or multi-carrier symbol, which is then mapped to the antenna 420 by the transmitting processor 415 via the transmitter 416 and is transmitted in the form of a radio frequency signal. The first sequence in the present disclosure is mapped by the transmitting processor 415 onto the target air interface resources and is mapped to the antenna 420 via the transmitter 416 and is transmitted in the form of a radio frequency signal. At the receiving end, each receiver 456 receives a radio frequency signal through its respective antenna 460. Each receiver 456 recovers the baseband information modulated onto the radio frequency carrier and provides the baseband information to the receiving processor 452. The receiving processor 452 implements various signal receiving processing functions for the L1 layer. The signal receiving processing function includes monitoring the first sequence in the present disclosure and receiving the physical layer signals carrying the first information, the second information, the first radio signal and the second radio signal, performing demodulation based on various modulation schemes (such as Binary Phase Shift Keying (BPSK), Quadrature Phase Shift Keying (QPSK)) through the multi-carrier symbols in the multi-carrier symbol stream, then decoding and deinterleaving to recover data or control signals transmitted by the eNB 410 on the physical channel, and then providing the data and control signals to the controller/processor 490. The controller/processor 490 implements the L2 layer. The controller/processor may be associated with a memory 480 in which program codes and data are stored. The memory 480 may be referred to as a computer-readable medium.

In one embodiment, the UE 450 device includes: at least one processor and at least one memory, wherein the at least one memory includes a computer program code; the at least one memory and the computer program code are configured to be used together with the at least one processor. The UE 450 device at least includes: receiving first information; monitoring a first sequence in target air interface resources; and receiving a first radio signal if the first sequence is detected; wherein the target air interface resources are one of M candidate air interface resources, the first sequence is repeatedly transmitted Q times in the time-domain resources included in the target air interface resources, the M is related to the Q, the first information is used to determine the time-domain resources included in the target air interface resources, and the M and the Q are positive integers, respectively.

In one embodiment, the UE 450 includes: a memory in which a computer-readable instruction program is stored, wherein the computer-readable instruction program generates an action when executed by the at least one processor. The action including: receiving first information; monitoring a first sequence in target air interface resources; and receiving a first radio signal if the first sequence is detected; wherein the target air interface resources are one of M candidate air interface resources, the first sequence is repeatedly transmitted Q times in the time-domain resources included in the target air interface resources, the M is related to the Q, the first information is used to determine the time-domain resources included in the target air interface resources, and the M and the Q are positive integers, respectively.

In one embodiment, the eNB 410 device includes: at least one processor and at least one memory, wherein the at least one memory includes a computer program code; the at least one memory and the computer program code are configured to be used together with the at least one processor. The eNB 410 device at least includes: transmitting first information; transmitting a first sequence in target air interface resources; and transmitting a first radio signal; wherein the target air interface resources are one of M candidate air interface resources, the first sequence is repeatedly transmitted Q times in the time-domain resources included in the target air interface resources, the M is related to the Q, the first information is used to determine the time-domain resources included in the target air interface resources, and the M and the Q are positive integers, respectively.

In one embodiment, the eNB 410 includes: a memory in which a computer-readable instruction program is stored, wherein the computer-readable instruction program generates an action when executed by the at least one processor. The action including: transmitting first information; transmitting a first sequence in target air interface resources; and transmitting a first radio signal; wherein the target air interface resources are one of M candidate air interface resources, the first sequence is repeatedly transmitted Q times in the time-domain resources included in the target air interface resources, the M is related to the Q, the first information is used to determine the time-domain resources included in the target air interface resources, and the M and the Q are positive integers, respectively.

In one embodiment, the UE 450 corresponds to the user equipment in the present disclosure.

In one embodiment, the gNB 410 corresponds to the base station in the present disclosure.

In one embodiment, the receiver 456 (including an antenna 460) and the receiving processor 452 are configured to monitor the first sequence in the present disclosure.

In one embodiment, the receiver 456 (including an antenna 460), the receiving processor 452 and the controller/processor 490 are configured to receive the first information in the present disclosure.

In one embodiment, the receiver 456 (including an antenna 460), the receiving processor 452 and the controller/processor 490 are configured to receive the second information in the present disclosure.

In one embodiment, the receiver 456 (including an antenna 460), the receiving processor 452 and the controller/processor 490 are configured to receive the first radio signal in the present disclosure.

In one embodiment, the receiver 456 (including an antenna 460), the receiving processor 452 and the controller/processor 490 are configured to receive the second radio signal in the present disclosure.

In one embodiment, the transmitter 416 (including an antenna 420) and the transmitting processor 415 are configured to transmit the first sequence in the present disclosure.

In one embodiment, the transmitter 416 (including an antenna 420), the transmitting processor 415 and the controller/processor 440 are configured to transmit the first information in the present disclosure.

In one embodiment, the transmitter 416 (including an antenna 420), the transmitting processor 415 and the controller/processor 440 are configured to transmit the second information in the present disclosure.

In one embodiment, the transmitter 416 (including an antenna 420), the transmitting processor 415 and the controller/processor 440 are configured to transmit the first radio signal in the present disclosure.

In one embodiment, the transmitter 416 (including an antenna 420), the transmitting processor 415 and the controller/processor 440 are configured to transmit the second radio signal in the present disclosure.

Embodiment 5

Figure 5:
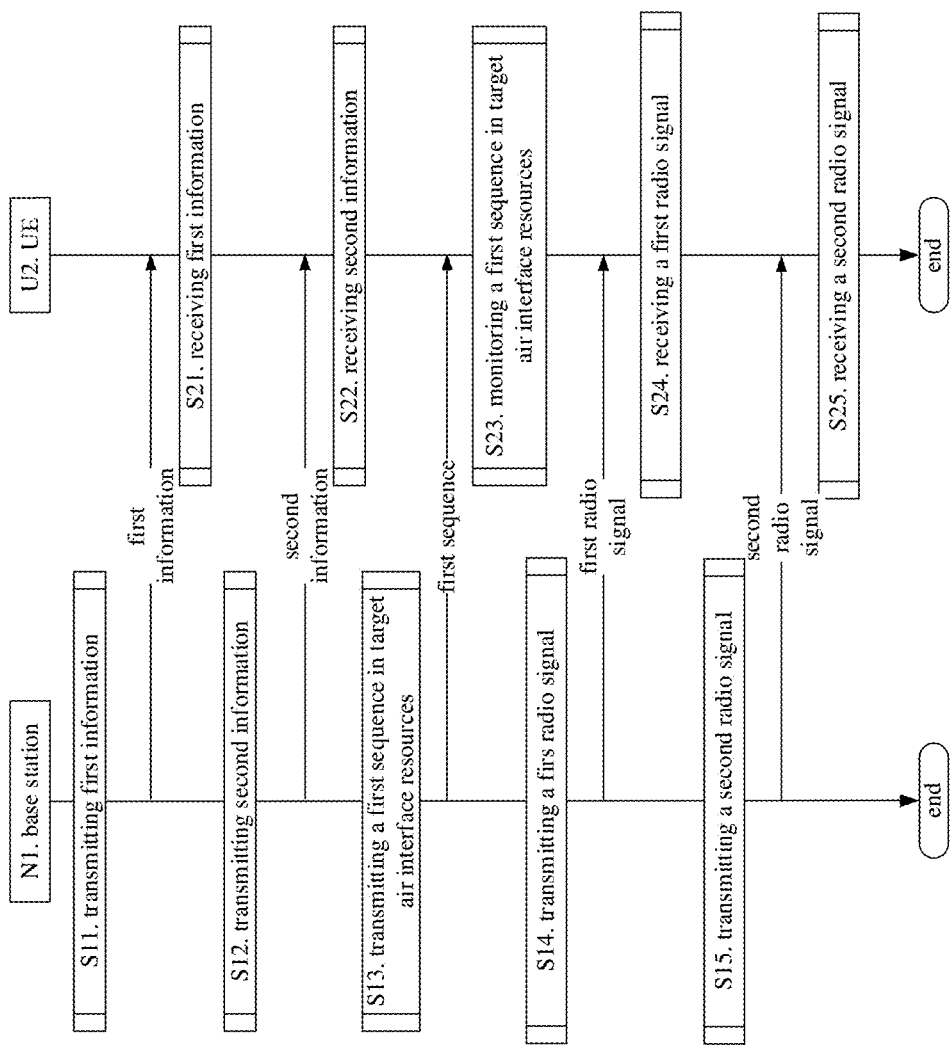
FIG. 5 is a flow chart illustrating transmission of a radio signal according to one embodiment of the present disclosure.

Embodiment 5 is a flow chart illustrating transmission of a radio signal according to one embodiment of the present disclosure, as shown in FIG. 5. In FIG. 5, the base station N1 is a maintenance base station of the serving cell of the UE U2.

The base station N1 transmits first information in step S11, transmits second information in step S12, transmits a first sequence in target air interface resources in step S13, transmits a first radio signal in step S14, and transmits a second radio signal in step S15.

The UE U2 receives first information in step S21, receives second information in step S22, detects a first sequence in target air interface resources in step S23, receives a first radio signal in step S24, and receives a second radio signal in step S25.

In Embodiment 5, the target air interface resources are one of M candidate air interface resources, the first sequence is repeatedly transmitted Q times in the time-domain resources included in the target air interface resources, the M is related to the Q, the first information is used to determine the time-domain resources included in the target air interface resources, and the M and the Q are positive integers, respectively; the first radio signal carries a first signaling, the first signaling is used to determine at least one of time-frequency resources occupied by the second radio signal, and a MCS used by the second radio signal; the second radio signal carries Y identifiers, where the Y is a positive integer, and the Y identifiers are used to determine whether a receiver of the second radio signal is paged; a starting time-slot of the target air interface resources in the time domain belongs to a first time window, the first time window is one of L time windows, the second information includes L pieces of sub-information for the L time windows, a piece of sub-information for the first time window among the L pieces of sub-information is first sub-information, and the first sub-information is used to determine whether the first sequence is not transmitted, where the L is a positive integer not less than one.

In one embodiment, the first information indicates a target combination in X candidate combinations, any one of the X candidate combinations includes one of X1 first-class positive integers and one of X2 second-class positive integers, a first-class positive integer included in the target combination is equal to an amount of time-domain resources included in the target air interface resources, and a second-class positive integer included in the target combination is equal to the M, where the X is a positive integer, the X1 is a positive integer, and the X2 is a positive integer.

In one embodiment, the M candidate air interface resources are in one-to-one correspondence with M terminal groups, any one of the M terminal groups includes a positive integer number of terminals, the target air interface resources correspond to a target terminal group, the target terminal group is one of the M terminal groups, and a monitor of the first sequence belongs to the target terminal group.

In one embodiment, a feature ID of a monitor of the first sequence is used to determine at least one of a position of the target air interface resources in the time domain, a position of the target air interface resources in the frequency domain, and a position of the target air interface resources in the code domain.

In one embodiment, the first sub-information is used to determine whether the first sequence is not transmitted, indicating that the first sub-information indicates whether a receiver of the first sub-information can assume that the first radio signal is not transmitted.

In one embodiment, the L pieces of sub-information are carried by L bits, respectively.

In one embodiment, each of the L pieces of sub-information is carried by a positive integer number of bits.

In one embodiment, the L time windows are L of time windows periodically appearing with the total time length of the L time windows as the period, and the second information is applied to each of the periods.

In one embodiment, the second information is carried by high-layer signaling.

In one embodiment, the second information is carried by Radio Resource Control (RRC) signaling.

In one embodiment, the second information includes a System Information Block (SIB).

In one embodiment, the second information includes all or a part of System Information Block Type 1 (SIB1) and System Information Block Type 2 (SIB2).

In one embodiment, the second information includes all or a part of System Information Block Type 1-Narrow Band (NB) (SIB1-NB) and System Information Block Type 2-Narrow Band (NB) (SIB2-NB).

In one embodiment, the first information and the second information are two Information Elements (IEs) in one RRC signaling.

In one embodiment, the first information and the second information are two fields in one RRC signaling.

Embodiment 6

Figure 6:
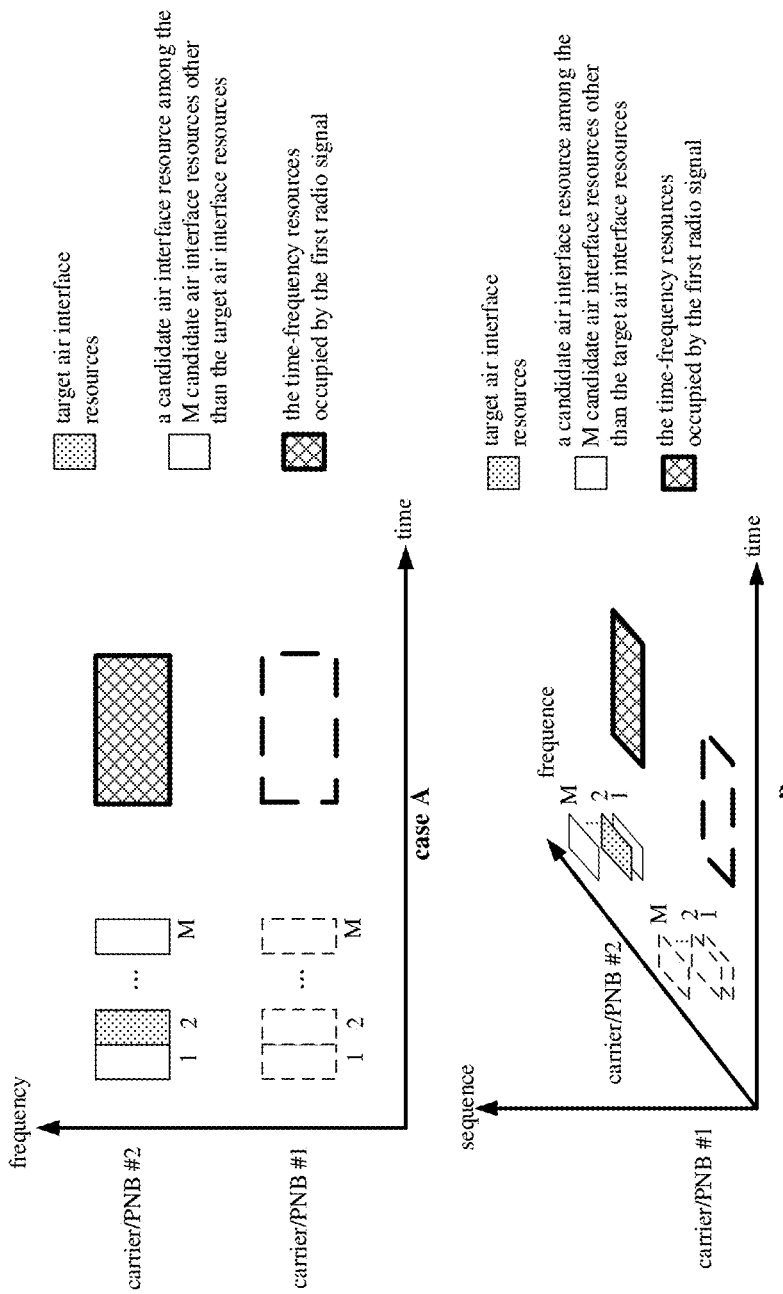
FIG. 6 is a schematic diagram illustrating a relationship between target air interface resources and M candidate air interface resources according to an embodiment of the present disclosure.

Embodiment 6 is a schematic diagram illustrating a relationship between target air interface resources and M candidate air interface resources according to an embodiment of the present disclosure, as shown in FIG. 6. In FIG. 6, the horizontal axis represents time. In case A, the M candidate air interface resources correspond to M time-frequency resources, respectively, and the vertical axis represents a frequency. In case B, the M candidate air interface resources correspond to M sequence resources, respectively. The horizontal axis represents a frequency, and the vertical axis represents a sequence. The rectangle filled by dots represents target air interface resources, the rectangle filled by cross lines represents the time-frequency resources occupied by the first radio signal, the unfilled rectangle of solid lines represents the air interface resources among the M candidate air interface resources other than the target air interface resources, and the rectangle of broken lines represents the resources on the occupied carrier.

In Embodiment 6, the target air interface resources are one of M candidate air interface resources, the first sequence is repeatedly transmitted Q times in the time-domain resources included in the target air interface resources, the M is related to the Q, the first information is used to determine the time-domain resources included in the target air interface resources, and the M and the Q are positive integers, respectively; a feature ID of a monitor of the first sequence is used to determine at least one of a position of the target air interface resources in the time domain, a position of the target air interface resources in the frequency domain, and a position of the target air interface resources in the code domain.

In one embodiment, each of the M candidate air interface resources includes at least one of time-frequency resources and code domain resources.

In one embodiment, the M candidate air interface resources include M candidate sequences and time-frequency resources respectively occupied by the M candidate sequences, respectively, the first sequence is one of the M candidate sequences, and the target air interface resources include the first sequence and time-frequency resources occupied by the first sequence.

In one embodiment, the M candidate air interface resources include M candidate sequences, respectively, the first sequence is one of the M candidate sequences, the target air interface resources include the first sequence, and any two of the M candidate sequences are not the same, where the M is greater than one.

In one embodiment, time-frequency resources included in any two of the M candidate air interface resources are the same.

In one embodiment, the M candidate air interface resources include M candidate sequences, respectively, time-frequency resources occupied by any two of the M candidate sequences are the same, the first sequence is one of the M candidate sequences, and the target air interface resources include code domain resources of the first sequence and time-frequency resources occupied by the first sequence, where the M is greater than 1.

In one embodiment, the M candidate air interface resources include M different candidate time-frequency resources, respectively.

In one embodiment, the M candidate air interface resources include M different candidate time-frequency resources, respectively, and each of the M different candidate time-frequency resources carry the first sequence.

In one embodiment, the M candidate air interface resources include M different candidate time-frequency resources, respectively, and two of the M different candidate time-frequency resources carry different sequences, where the M is greater than 1.

In one embodiment, the feature ID of the monitor of the first sequence refers to an International Mobile Subscriber Identification Number (IMSI) of the user equipment.

In one embodiment, the feature ID of the monitor of the first sequence refers to the remainder of the International Mobile Subscriber Identification Number (IMSI) of the user equipment to 1024.

In one embodiment, the feature ID of the monitor of the first sequence refers to the remainder of the International Mobile Subscriber Identification Number (IMSI) of the user equipment to 4096.

In one embodiment, the feature ID of the monitor of the first sequence refers to the remainder of the International Mobile Subscriber Identification Number (IMSI) of the user equipment to 16384.

In one embodiment, the position of the target air interface resource in the time domain refers to a position of a DRX to which the target air interface resources in the time domain belong.

In one embodiment, the position of the target air interface resource in the time domain refers to the position of a Paging Frame (PF) to which the target air interface resources in the time domain belong.

In one embodiment, the position of the target air interface resource in the time domain refers to the absolute position of the target air interface resources in the time domain.

In one embodiment, the position of the target air interface resource in the time domain refers to the relative position of the target air interface resources in the time domain with respect to a position of a PO of the user equipment in the PF to which the target air interface resources belong.

In one embodiment, the position of the target air interface resources in the time domain is obtained by:

$$\text{Offset}(i) = H^*(\text{UE\_ID} \bmod M)$$

where the Offset (i) represents the time offset of the target air interface resources in the time domain from a PO in the PF to which the target air interface resources belong, and H is a unit of time length.

In one embodiment, the position of the target air interface resources in the frequency domain refers to a position of the carrier to which the target air interface resources in the frequency domain belong.

In one embodiment, the position of the target air interface resources in the frequency domain refers to a position of the narrow band to which the target air interface resources in the frequency domain belong.

In one embodiment, the position of the target air interface resources in the frequency domain refers to an absolute position of the target air interface resources in the frequency domain.

In one embodiment, the position of the target air interface resources in the frequency domain is determined based on a method of determining a PNB or a paging carrier in section 7.1 of 3GPP TS 36.304.

In one embodiment, the target air interface resources occupy a Physical Resource Block (PRB) in the frequency domain, and the position of the target air interface resources in the frequency domain refers to a position of the PRB occupied by the target air interface resources in the frequency domain in the LTE carrier to which it belongs.

In one embodiment, the position of the target air interface resources in the code domain refers to an index of the sequence included in the target air interface resources in the sequence set to which it belongs.

In one embodiment, the position of the target air interface resource in the code domain is determined by:

$$\text{Seq\_index} = \lfloor G/M \rfloor \times (\text{UE\_ID ``mod'' } M) + \Delta$$

where Seq_index is an index of the sequence included in the target air interface resources, G is a total number of the supported sequences, and $\Delta$ is an offset of the start sequence.

In one embodiment, the feature ID of the monitor of the first sequence determines at least one of the position of the target air interface resources in the time domain, the position of the target air interface resources in the frequency domain, and the position of the target air interface resources in the code domain based on a given mapping relationship.

In one embodiment, the feature ID of the monitor of the first sequence determines at least one of the position of the target air interface resources in the time domain, the position of the target air interface resources in the frequency domain, and the position of the target air interface resources in the code domain based on a given mapping relationship.

Embodiment 7

Embodiment 7 is a schematic diagram illustrating a target combination according to one embodiment of the present disclosure, as shown in FIG. 7. In FIG. 7, the first column represents indices indicated by the first information, the second column represents first-class positive integers, and the third column represents second-class positive integers.

In Embodiment 7, the first information indicates a target combination in X candidate combinations, any one of the X candidate combinations includes one of X1 first-class positive integers and one of X2 second-class positive integers, a first-class positive integer included in the target combination is equal to an amount of time-domain resources included in the target air interface resources in the present disclosure, and a second-class positive integer included in the target combination is equal to the M in the present disclosure, where the X is a positive integer, the X1 is a positive integer, and the X2 is a positive integer.

In one embodiment, any two of the X candidate combinations are different.

In one embodiment, the X is less than the product of the X1 and the X2.

In one embodiment, the X is equal to the product of the X1 and the X2.

In one embodiment, any two of the X1 first-class positive integers are not equal.

In one embodiment, any two of the X2 second-class positive integers are not equal.

In one embodiment, the amount of time-domain resources included in the target air interface resources is one of the X1 first-class positive integers, and the M is one of the X2 second-class positive integers.

In one embodiment, the X1 first-class positive integers are configurable.

In one embodiment, the X1 first-class positive integers are predefined.

In one embodiment, the X2 second-class positive integers are configurable.

In one embodiment, the X2 second-class positive integers are predefined.

In one embodiment, the X candidate combinations include all combinations which can be formed by the X1 first-class positive integers and the X2 second-class positive integers.

In one embodiment, the X candidate combinations include a part of the combinations which can be formed by the X1 first-class positive integers and the X2 second-class positive integers.

In one embodiment, the X candidate combinations include a part of the combinations which can be formed by the X1 first-class positive integers and the X2 second-class positive integers; the X candidate combinations are predefined in all combinations which can be formed by the X1 first-class positive integers and the X2 second-class positive integers, or the X candidate combinations are configurable in the combinations which can be formed by the X1 first-class positive integers and the X2 second-class positive integers.

In one embodiment, the X candidate combinations include a part of the combinations which can be formed by the X1 first-class positive integers and the X2 second-class positive integers; the X candidate combinations are predefined in all combinations which can be formed by the X1 first-class positive integers and the X2 second-class positive integers, and the predefining is implemented by detecting the operating point of the target SINR of the first sequence.

In one embodiment, the X candidate combinations include a part of the combinations which can be formed by the X1 first-class positive integers and the X2 second-class positive integers; the X candidate combinations are predefined in all combinations which can be formed by the X1 first-class positive integers and the X2 second-class positive integers, and the predefining is implemented by detecting the overhead of the time-frequency resource required by the first sequence.

In one embodiment, the amount of time-domain resources included in the target air interface resources is the number of subframes included in the target air interface resources in the time domain.

In one embodiment, the amount of time-domain resources included in the target air interface resources is the number of multi-carrier symbols included in the target air interface resources in the time domain.

In one embodiment, the amount of time-domain resources included in the target air interface resources is a multiple of the time-domain resources occupied by the first sequence included in the target air interface resources in the time domain during transmission at a time.

In one embodiment, the first information explicitly indicates the target combination in the X candidate combinations.

In one embodiment, the first information implicitly indicates the target combination in the X candidate combinations.

Embodiment 8

Figure 8:
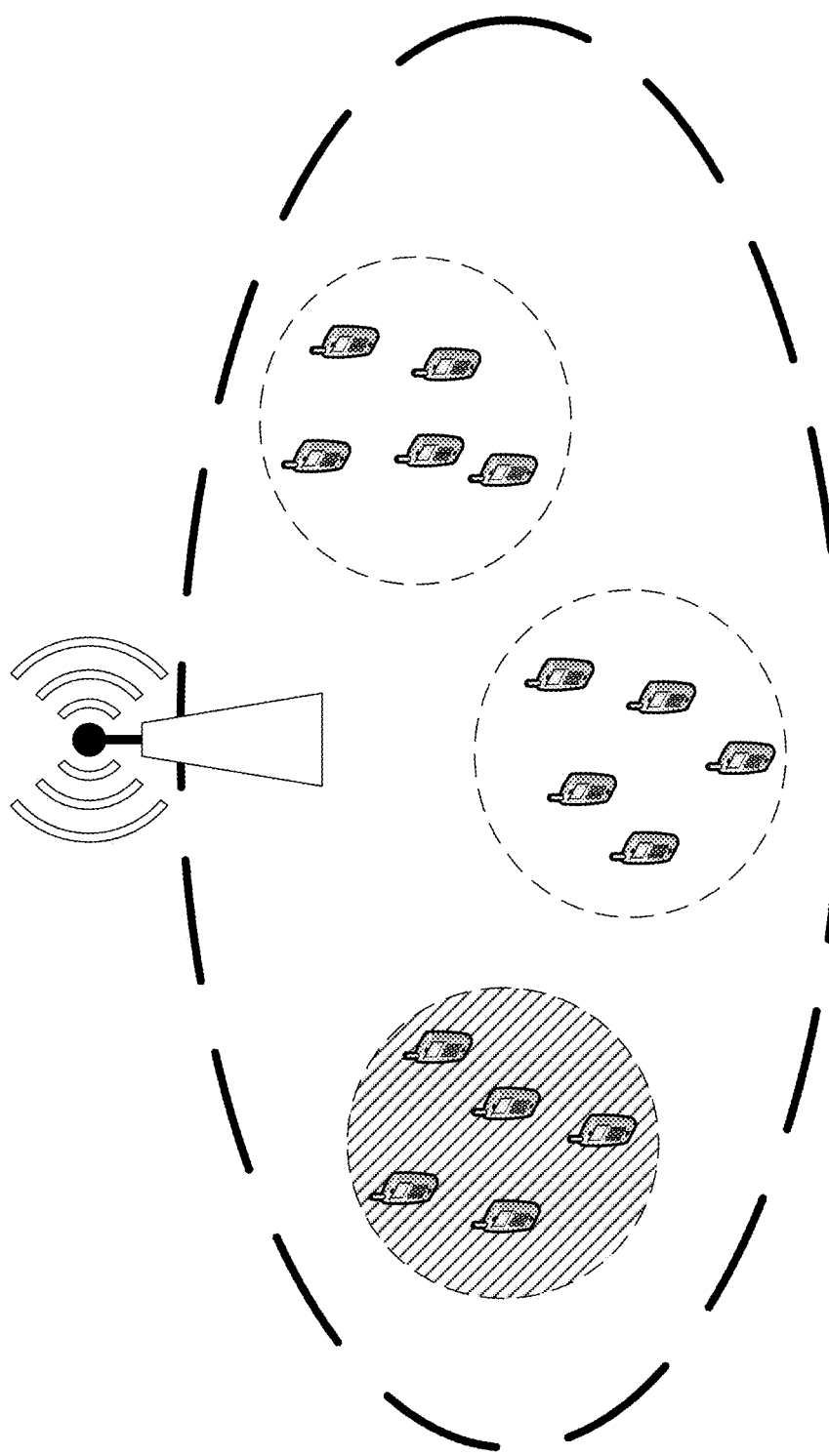
FIG. 8 is a schematic diagram illustrating a relationship between a target terminal group and M terminal groups according to an embodiment of the present disclosure.

Embodiment 8 is a schematic diagram illustrating a relationship between a target terminal group and M terminal groups according to an embodiment of the present disclosure, as shown in FIG. 8. In FIG. 8, a large elliptical area of thick broken lines represents a cell or a Tracking Area (TA), a small circle of each thin broken line represents a terminal group among M terminal groups, and a small circle filled with oblique lines represents the target terminal group.

In Embodiment 8, the M candidate air interface resources in the present disclosure is in one-to-one correspondence with M terminal groups, any one of the M terminal groups includes a positive integer number of terminals, the target air interface resources in the present disclosure corresponds to a target terminal group, the target terminal group is one of the M terminal groups, and a monitor of the first sequence in the present disclosure belongs to the target terminal group.

In one embodiment, by performing packet processing on the terminal, the user equipment may initially determine whether to be paged by detecting the target terminal group, effectively reducing the burden of subsequent blind detections, thereby further reducing power consumption.

In one embodiment, the first sequence belongs to one of M feature sequences, any two of the M feature sequences are different, and the M feature sequences represent the M terminal groups, respectively.

In one embodiment, any two of the M terminal groups are different.

In one embodiment, two of the M terminal groups are the same.

In one embodiment, two of the M terminal groups include at least one identical terminal.

In one embodiment, there is no terminal that belongs to two of the M terminal groups at the same time.

In one embodiment, there is one terminal that belongs to two of the M terminal groups at the same time.

In one embodiment, all the terminals in the M terminal groups belong to one Tracking Area (TA).

In one embodiment, all the terminals in the M terminal groups belong to one Tracking Area List (TA List).

In one embodiment, all the terminals in the M terminal groups are connected to the same Mobility Management Entity (MME) at the Non-Access Stratum (NAS).

In one embodiment, all the terminals in the target terminal group belong to one Tracking Area (TA).

In one embodiment, the core network divides all the terminals under one TA into a plurality of terminal groups, and the first sequence carries information used to page the terminals in one terminal group, without including information of all the terminals in all terminal groups.

In one embodiment, the M terminal groups are obtained by grouping the feature ID of the terminals (user equipment).

In one embodiment, the M terminal groups are obtained by grouping the feature ID of the terminals through a given mathematical transformation.

In one embodiment, the i-th terminal group of the M terminal groups is obtained by:

$$UE\_ID \bmod M = i$$

where the UE_ID is the feature ID of user equipment, such as the definition of the UE_ID in 3GPP TS36.304.

Embodiment 9

Figure 9:
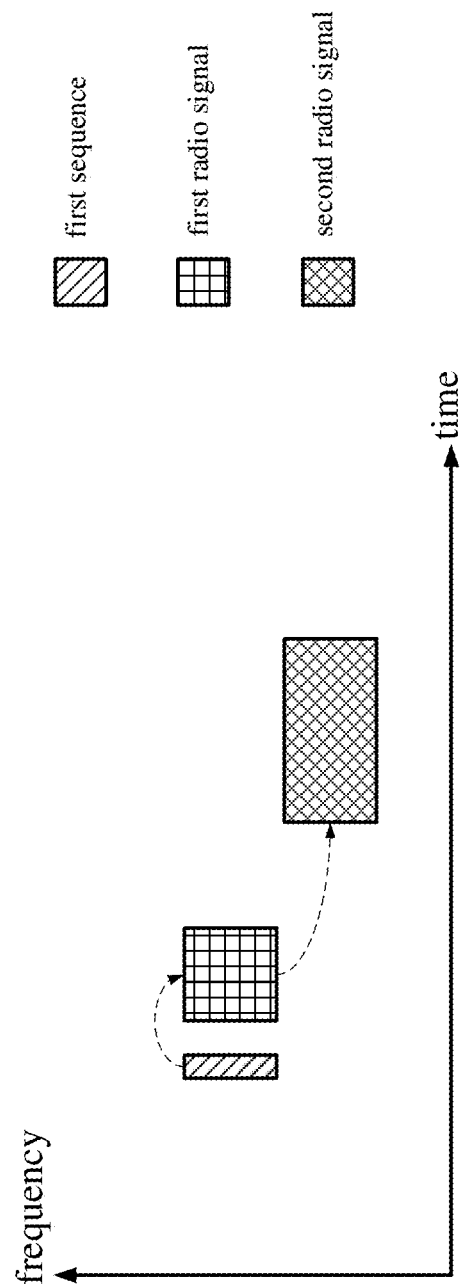
FIG. 9 is a schematic diagram illustrating a relationship between a first radio signal and a second radio signal according to an embodiment of the present disclosure.

Embodiment 9 is a schematic diagram illustrating a relationship between a first radio signal and a second radio signal according to an embodiment of the present disclosure, as shown in FIG. 9. In FIG. 9, the horizontal axis represents time, the vertical axis represents frequency, the rectangle filled with oblique lines represents the time-frequency resources occupied by the first sequence, the rectangle filled with cross lines represents the time-frequency resources occupied by the first radio signal, and the rectangle filled with intersection lines represents the time-frequency resources occupied by the second radio signal.

In Embodiment 9, the first radio signal in the present disclosure carries a first signaling, the first signaling is used to determine at least one of time-frequency resources occupied by the second radio signal, and a MCS used by the second radio signal, the second radio signal carries Y identifiers, where the Y is a positive integer, and the Y identifiers are used to determine whether a receiver of the second radio signal is paged.

In one embodiment, the second radio signal is transmitted through a Paging Channel (PCH).

In one embodiment, the second radio signal is transmitted through a Physical Downlink Shared Channel (PDSCH).

In one embodiment, the second radio signal is transmitted through a Narrow Band Physical Downlink Shared Channel (NPDSCH).

In one embodiment, the second radio signal is transmitted through a Machine type Physical Downlink Shared Channel (MPDSCH).

In one embodiment, the Modulation and Coding Scheme (MCS) includes at least one of {Binary Phase Shift Keying (BPSK), π/2 BPSK, Quadrature Phase Shift Keying (QPSK), π/4 QPSK, and Quadrature Amplitude Modulation (16QAM)}.

In one embodiment, the Y is equal to 1.

In one embodiment, the Y is equal to 16.

In one embodiment, the Y is greater than 1 and the Y is less than 16.

In one embodiment, the Y is greater than 16.

In one embodiment, any one of the Y identifiers is a feature ID of a piece of user equipment.

In one embodiment, any one of the Y identifiers is a part of a feature ID of a piece of user equipment.

In one embodiment, any one of the Y identifiers is obtained by a feature ID of a piece of user equipment through a given mathematical transformation.

In one embodiment, any one of the Y identifiers is an International Mobile Subscriber Identification (IMSI).

In one embodiment, any one of the Y identifiers is a System Architecture Evolution-Temporary Mobile Subscriber Identity (S-TMSI).

In one embodiment, the first signaling includes physical layer signaling.

In one embodiment, the first signaling includes all or a part of the fields of a piece of Downlink Control Information (DCI).

In one embodiment, the first signaling is transmitted through a Physical Downlink Control Channel (PDCCH).

In one embodiment, the first signaling is transmitted through a Narrow Band Physical Downlink Control Channel (NPDCCH).

In one embodiment, the first signaling is transmitted through a Machine type Physical Downlink Control Channel (MPDCCH).

In one embodiment, the first signaling includes a piece of DCI of a CRC scrambled by a Paging Radio Network Temporary Identity (P-RNTI).

In one embodiment, the Y identifiers indicate whether the receiver of the second radio signal is paged.

Embodiment 10

Figure 10:
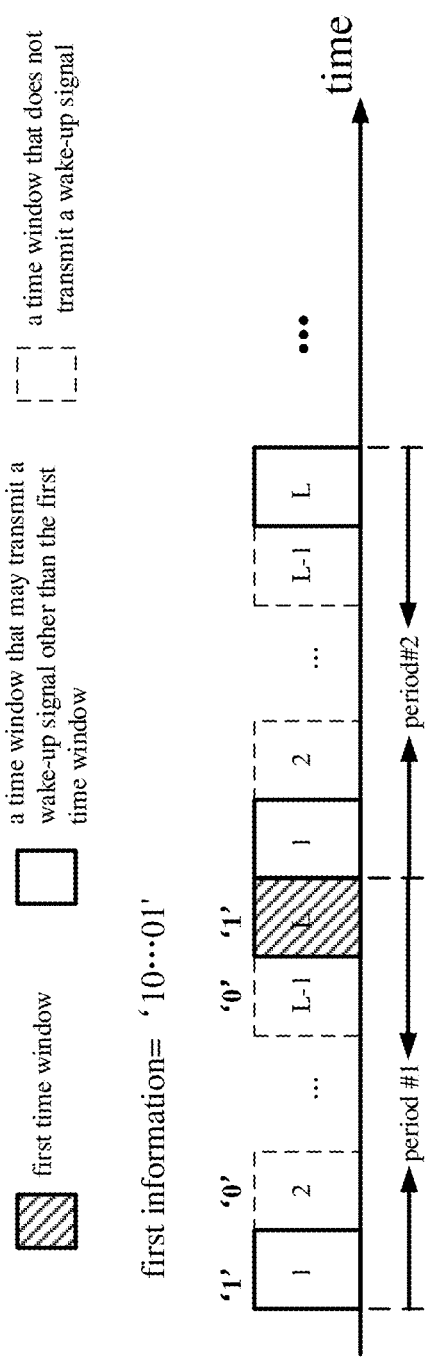
FIG. 10 is a schematic diagram illustrating a relationship between a first time window and L time windows according to an embodiment of the present disclosure.

Embodiment 10 is a schematic diagram illustrating a relationship between a first time window and L time windows according to an embodiment of the present disclosure, as shown in FIG. 10. In FIG. 10, the horizontal axis represents time, the rectangle filled with oblique lines represents the first time window, L rectangles in which the order in period #1 is marked with 1, 2, . . . , L, represent L time windows, respectively, each of the unfilled rectangles of solid lines represents a time window that may transmit a wake-up signal other than the first time window, and each of the unfilled rectangles of broken lines represents a time window that may not transmit a wake-up signal.

In Embodiment 10, a starting timeslot of the target air interface resources in the time domain in the present disclosure belongs to a first time window, the first time window is one of L time windows, the second information in the present disclosure includes L pieces of sub-information for the L time windows, respectively, a piece of sub-information for the first time window among the L pieces of sub-information is first sub-information, and the first sub-information is used to determine whether the first sequence is not transmitted in the present disclosure, where the L is a positive integer not less than one.

In one embodiment, any one of the L time windows is a Discontinuous Reception (DRX) period.

In one embodiment, any one of the L time windows is an enhanced Discontinuous Reception (eDRX) period.

In one embodiment, any one of the L time windows is a radio frame.

In one embodiment, any one of the L time windows is a subframe of a possible Paging Occasion (PO) in a radio frame.

In one embodiment, any one of the L time windows is a subframe of a possible Paging Occasion (PO) in a radio frame.

In one embodiment, any one of the L time windows is a sub-frame in {subframe #0, sub-frame #4, sub-frame #5, and sub-frame #9} in a radio frame.

In one embodiment, any one of the L time windows is a sub-frame in {subframe #0, sub-frame #1, sub-frame #5, and sub-frame #6} in a radio frame.

In one embodiment, the L and the number of radio frames in a DRX period are relatively prime.

In one embodiment, the L and 4 are relatively prime.

In one embodiment, the L and the number of DRXs in a Hyper frame are relatively prime.

In one embodiment, the L and the quotient of 1024 and the number of radio frames in a DRX period are relatively prime.

In one embodiment, the L time windows are predefined.

In one embodiment, the L time windows are pairwise orthogonal.

In one embodiment, any two of the L time windows have the same time length.

In one embodiment, the L time windows are continuous.

In one embodiment, the L time windows are discontinuous.

In one embodiment, the L time windows are L of time windows periodically appearing with the total time length of the L time windows as the period.

Embodiment 11

Figure 11:
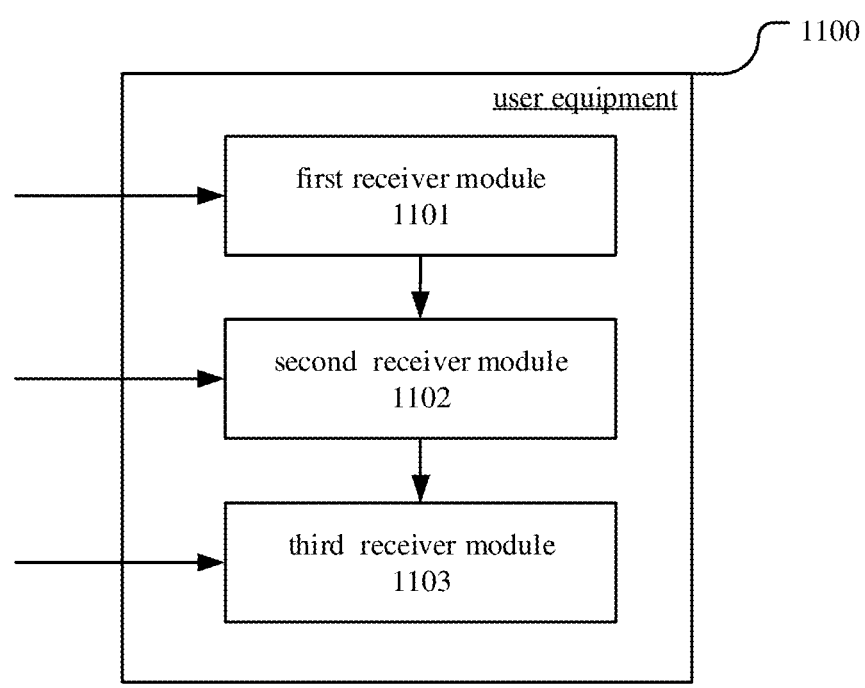
FIG. 11 is a block diagram illustrating the structure of a processing device in User Equipment (UE) according to an embodiment of the present disclosure.

Embodiment 11 is a block diagram illustrating the structure of a processing device in UE according to an embodiment of the present disclosure, as shown in FIG. 11. In FIG. 11, the user equipment processing device 1100 mainly consists of a first receiver module 1101, a second receiver module 1102, and a third receiver module 1103. The first receiver module 1101 includes the transmitter/receiver 456 (including an antenna 460), the receiving processor 452 and the controller/processor 490 in FIG. 4 of the present disclosure; the second receiver module 1102 includes the transmitter/receiver 456 (including an antenna 460) and the receiving processor 452 in FIG. 4 of the present disclosure; and the third receiver module 1103 includes the transmitter/receiver 456 (including an antenna 460), the receiving processor 452 and the controller/processor 490 in FIG. 4 of the present disclosure.

In Embodiment 11, the first receiver module 1101 receives first information; the second receiver module 1102 monitors a first sequence in target air interface resources; and the third receiver module 1103 receives a first radio signal if the first sequence is detected; wherein the target air interface resources are one of M candidate air interface resources, the first sequence is repeatedly transmitted Q times in the time-domain resources included in the target air interface resources, the M is related to the Q, the first information is used to determine the time-domain resources included in the target air interface resources, and the M and the Q are positive integers, respectively.

In one embodiment, the first information indicates a target combination in X candidate combinations, any one of the X candidate combinations includes one of X1 first-class positive integers and one of X2 second-class positive integers, a first-class positive integer included in the target combination is equal to an amount of time-domain resources included in the target air interface resources, and a second-class positive integers included in the target combination is equal to the M, where the X is a positive integer, the X1 is a positive integer, and the X2 is a positive integer.

In one embodiment, the M candidate air interface resources are in one-to-one correspondence with M terminal groups, any one of the M terminal groups includes a positive integer number of terminals, the target air interface resources correspond to a target terminal group, the target terminal group is one of the M terminal groups, and a monitor of the first sequence belongs to the target terminal group.

In one embodiment, the third receiver module 1103 receives a second radio signal; wherein the first radio signal carries a first signaling, the first signaling is used to determine at least one of time-frequency resources occupied by the second radio signal, and a MCS used by the second radio signal, the second radio signal carries Y identifiers, where the Y is a positive integer, and the Y identifiers are used to determine whether a receiver of the second radio signal is paged.

In one embodiment, the first receiver module 1101 receives second information, wherein a starting timeslot of the target air interface resources in the time domain belongs to a first time window, the first time window is one of L time windows, the second information includes L pieces of sub-information for the L time windows respectively, a piece of sub-information for the first time window among the L pieces of sub-information is first sub-information, and the first sub-information is used to determine whether the first sequence is not transmitted, where the L is a positive integer not less than one.

In one embodiment, a feature ID of a monitor of the first sequence is used to determine at least one of a position of the target air interface resources in the time domain, a position of the target air interface resources in the frequency domain, and a position of the target air interface resources in the code domain.

Embodiment 12

Figure 12:
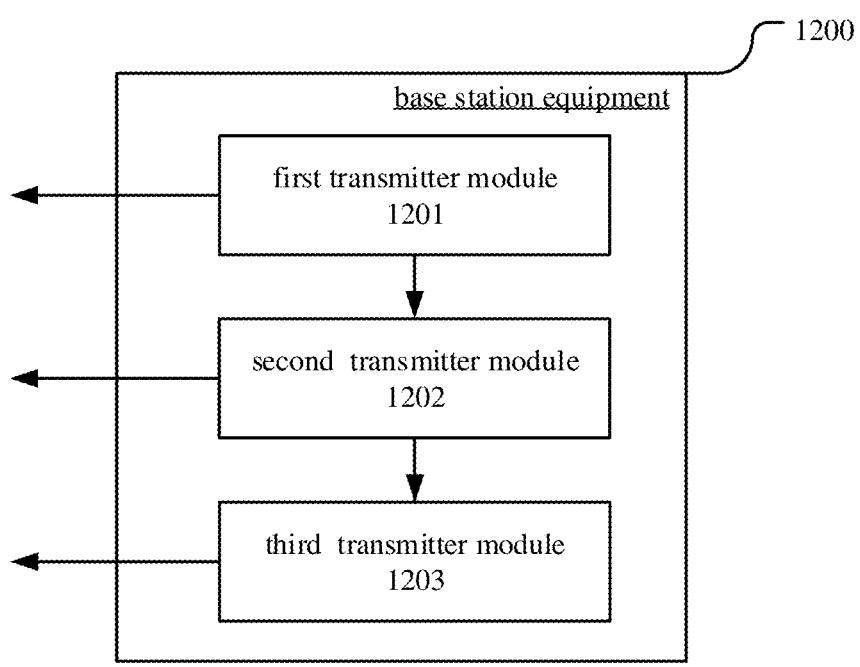
FIG. 12 is a block diagram illustrating the structure of a processing device in a base station according to an embodiment of the present disclosure.

Embodiment 12 is a block diagram illustrating the structure of a processing device in a piece of base station equipment, as shown in FIG. 12. In FIG. 12, the base station processing device 1200 mainly consists of a first transmitter module 1201, a second transmitter module 1202, and a third transmitter module 1203. The first transmitter module 1201 includes the transmitter/receiver 416 (including an antenna 420), the transmitting processor 415 and the controller/processor 440 in FIG. 4 of the present disclosure; the second transmitter module 1202 includes the transmitter/receiver 416 (including an antenna 420) and the transmitting processor 415 in FIG. 4 of the present disclosure; and the third transmitter module 1203 includes the transmitter/receiver 416 (including an antenna 420), the transmitting processor 415 and the controller/processor 440 in FIG. 4 of the present disclosure.

In Embodiment 12, the first transmitter module 1201 transmits first information; the second transmitter module 1202 transmits a first sequence in target air interface resources; and the third transmitter module 1203 transmits a first radio signal; wherein the target air interface resources are one of M candidate air interface resources, the first sequence is repeatedly transmitted Q times in the time-domain resources included in the target air interface resources, the M is related to the Q, the first information is used to determine the time-domain resources included in the target air interface resources, and the M and the Q are positive integers, respectively.

In one embodiment, the first information indicates a target combination in X candidate combinations, any one of the X candidate combinations includes one of X1 first-class positive integers and one of X2 second-class positive integers, a first-class positive integer included in the target combination is equal to an amount of time-domain resources included in the target air interface resources, and a second-class positive integer included in the target combination is equal to the M, where the X is a positive integer, the X1 is a positive integer, and the X2 is a positive integer.

In one embodiment, the M candidate air interface resources are in one-to-one correspondence with M terminal groups, any one of the M terminal groups includes a positive integer number of terminals, the target air interface resources correspond to a target terminal group, the target terminal group is one of the M terminal groups, and a monitor of the first sequence belongs to the target terminal group.

In one embodiment, the third transmitter module 1203 transmits a second radio signal; wherein the first radio signal carries a first signaling, the first signaling is used to determine at least one of time-frequency resources occupied by the second radio signal, and a MCS used by the second radio signal; the second radio signal carries Y identifiers, where the Y is a positive integer, and the Y identifiers are used to determine whether a receiver of the second radio signal is paged.

In one embodiment, the first transmitter module 1201 transmits second information; wherein a starting timeslot of the target air interface resources in the time domain belongs to a first time window, the first time window is one of L time windows, the second information includes L pieces of sub-information for the L time windows respectively, a piece of sub-information for the first time window among the L pieces of sub-information is first sub-information, and the first sub-information is used to determine whether the first sequence is not transmitted, where the L is a positive integer not less than one.

In one embodiment, a feature ID of a monitor of the first sequence is used to determine at least one of a position of the target air interface resources in the time domain, a position of the target air interface resources in the frequency domain, and a position of the target air interface resources in the code domain.

The ordinary skill in the art may understand that all or part steps in the above method may be implemented by instructing related hardware through a program. The program may be stored in a computer-readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal in the present disclosure include but not limited to mobile phones, tablet computers, notebooks, network cards, low power consumption devices, eMTC devices, NB-IoT devices, in-vehicle communication devices, and other radio communication devices. The base station or network side device in the present application includes but not limited to macro-cellular base stations, micro-cellular base stations, home base stations, relay base stations, eNB, gNB, transmission receiving nodes TRP, and other radio communication devices.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in user equipment for wireless communications, comprising:
   receiving first information;
   monitoring a first sequence in target air interface resources; and
   receiving a first radio signal if the first sequence is detected;
   wherein the target air interface resources are one of M candidate air interface resources, the first sequence is repeatedly transmitted Q times in the time-domain resources included in the target air interface resources, the M is related to the Q, the first information is used to determine the time-domain resources included in the target air interface resources, the M and the Q are positive integers, respectively, the M candidate air interface resources are in one-to-one correspondence with M terminal groups, any one of the M terminal groups includes a positive integer number of terminals, the target air interface resources correspond to a target terminal group, the target terminal group is one of the M terminal groups, and a monitor of the first sequence belongs to the target terminal group.

2. The method according to claim 1, wherein the first information indicates a target combination in X candidate combinations, any one of the X candidate combinations includes one of X1 first-class positive integers and one of X2 second-class positive integers, a first-class positive integer included in the target combination is equal to an amount of time-domain resources included in the target air interface resources, and a second-class positive integer included in the target combination is equal to the M, where the X is a positive integer, the X1 is a positive integer, and the X2 is a positive integer.

3. The method according to claim 1, further comprising:
   receiving a second radio signal;
   wherein the first radio signal carries a first signaling, the first signaling is used to determine at least one of time-frequency resources occupied by the second radio signal, and a MCS used by the second radio signal, the second radio signal carries Y identifiers, where the Y is a positive integer, and the Y identifiers are used to determine whether a receiver of the second radio signal is paged.

4. The method according to claim 1, further comprising:
   receiving second information;
   wherein a starting timeslot of the target air interface resources in the time domain belongs to a first time window, the first time window is one of L time windows, the second information includes L pieces of sub-information for the L time windows respectively, a piece of sub-information for the first time window among the L pieces of sub-information is first sub-information, and the first sub-information is used to determine whether the first sequence is not transmitted, where the L is a positive integer not less than one.

5. A method in base station equipment for wireless communications, comprising:
   transmitting first information;
   transmitting a first sequence in target air interface resources; and transmitting a first radio signal;
   wherein the target air interface resources are one of M candidate air interface resources, the first sequence is repeatedly transmitted Q times in the time-domain resources included in the target air interface resources, the M is related to the Q, the first information is used to determine the time-domain resources included in the target air interface resources, the M and the Q are positive integers, respectively, the M candidate air interface resources are in one-to-one correspondence with M terminal groups, any one of the M terminal groups includes a positive integer number of terminals, the target air interface resources correspond to a target terminal group, the target terminal group is one of the M terminal groups, and a monitor of the first sequence belongs to the target terminal group.

6. The method according to claim 5, wherein the first information indicates a target combination in X candidate combinations, any one of the X candidate combinations includes one of X1 first-class positive integers and one of X2 second-class positive integers, a first-class positive integer included in the target combination is equal to an amount of time-domain resources included in the target air interface resources, and a second-class positive integer included in the target combination is equal to the M, where the X is a positive integer, the X1 is a positive integer, and the X2 is a positive integer.

7. The method according to claim 5, further comprising: transmitting a second radio signal;
wherein the first radio signal carries a first signaling, the first signaling is used to determine at least one of time-frequency resources occupied by the second radio signal, and a MCS used by the second radio signal, the second radio signal carries Y identifiers, where the Y is a positive integer, and the Y identifiers are used to determine whether a receiver of the second radio signal is paged.

8. The method according to claim 5, further comprising: transmitting second information;
wherein a starting timeslot of the target air interface resources in the time domain belongs to a first time window, the first time window is one of L time windows, the second information includes L pieces of sub-information for the L time windows respectively, a piece of sub-information for the first time window among the L pieces of sub-information is first sub-information, and the first sub-information is used to determine whether the first sequence is not transmitted, where the L is a positive integer not less than one.

9. User equipment for wireless communications, comprising:
a first receiver module to receive first information;
a second receiver module to monitor a first sequence in target air interface resources; and
a third receiver module to receive a first radio signal if the first sequence is detected;
wherein the target air interface resources are one of M candidate air interface resources, the first sequence is repeatedly transmitted Q times in the time-domain resources included in the target air interface resources, the M is related to the Q, the first information is used to determine the time-domain resources included in the target air interface resources, the M and the Q are positive integers, respectively, the M candidate air interface resources are in one-to-one correspondence with M terminal groups, any one of the M terminal groups includes a positive integer number of terminals, the target air interface resources correspond to a target terminal group, the target terminal group is one of the M terminal groups, and a monitor of the first sequence belongs to the target terminal group.

10. The user equipment according to claim 9, wherein the first information indicates a target combination in X candidate combinations, any one of the X candidate combinations includes one of X1 first-class positive integers and one of X2 second-class positive integers, a first-class positive integer included in the target combination is equal to an amount of time-domain resources included in the target air interface resources, and a second-class positive integer included in the target combination is equal to the M, where the X is a positive integer, the X1 is a positive integer, and the X2 is a positive integer.

11. The user equipment according to claim 9, wherein the third receiver module further receives a second radio signal; the first radio signal carries a first signaling, the first signaling is used to determine at least one of time-frequency resources occupied by the second radio signal, and a MCS used by the second radio signal, the second radio signal carries Y identifiers, where the Y is a positive integer, and the Y identifiers are used to determine whether a receiver of the second radio signal is paged.

12. The user equipment according to claim 9, wherein the first receiver module further receives second information; a starting timeslot of the target air interface resources in the time domain belongs to a first time window, the first time window is one of L time windows, the second information includes L pieces of sub-information for the L time windows respectively, a piece of sub-information for the first time window among the L pieces of sub-information is first sub-information, and the first sub-information is used to determine whether the first sequence is not transmitted, where the L is a positive integer not less than one.

13. Base station equipment for wireless communications, comprising:
a first transmitter module to transmit first information;
a second transmitter module to transmit a first sequence in target air interface resources; and
a third transmitter module to transmit a first radio signal;
wherein the target air interface resources are one of M candidate air interface resources, the first sequence is repeatedly transmitted Q times in the time-domain resources included in the target air interface resources, the M is related to the Q, the first information is used to determine the time-domain resources included in the target air interface resources, the M and the Q are positive integers, respectively, the M candidate air interface resources are in one-to-one correspondence with M terminal groups, any one of the M terminal groups includes a positive integer number of terminals, the target air interface resources correspond to a target terminal group, the target terminal group is one of the M terminal groups, and a monitor of the first sequence belongs to the target terminal group.

14. The base station equipment according to claim 13, wherein the first information indicates a target combination in X candidate combinations, any one of the X candidate combinations includes one of X1 first-class positive integers and one of X2 second-class positive integers, a first-class positive integer included in the target combination is equal to an amount of time-domain resources included in the target air interface resources, and a second-class positive integer included in the target combination is equal to the M, where the X is a positive integer, the X1 is a positive integer, and the X2 is a positive integer.

15. The base station equipment according to claim 13, wherein the third transmitter module further transmits a second radio signal; the first radio signal carries a first signaling, the first signaling is used to determine at least one of time-frequency resources occupied by the second radio signal, and a MCS used by the second radio signal, the second radio signal carries Y identifiers, where the Y is a positive integer, and the Y identifiers are used to determine whether a receiver of the second radio signal is paged.

16. The base station equipment according to claim 13, wherein the first transmitter module further transmits second information; a starting time-slot of the target air interface resources in the time domain belongs to a first time window, the first time window is one of L time windows, the second information includes L pieces of sub-information for the L time windows respectively, a piece of sub-information for the first time window among the L pieces of sub-information is first sub-information, and the first sub-information is used to determine whether the first sequence is not transmitted, where the L is a positive integer not less than one.

* * * * *